United States Patent [19]

Tushinsky

[11] 3,943,564

[45] Mar. 9, 1976

[54] STEREOPHONIC RECORDING AND PLAYBACK APPARATUS

[75] Inventor: Joseph S. Tushinsky, Los Angeles, Calif.

[73] Assignee: Superscope, Inc., Sun Valley, Calif.

[22] Filed: June 5, 1975

[21] Appl. No.: 476,621

[52] U.S. Cl. .................... 360/55; 360/137; 179/1 E

[51] Int. Cl.[2] ........................................ G11B 5/02

[58] Field of Search.... 360/55, 137; 179/1 E, 1 GA, 179/100.4 ST

[56] References Cited

UNITED STATES PATENTS

| | | | |
|---|---|---|---|
| 3,135,837 | 6/1964 | Tateishi | 179/100.4 ST |
| 3,710,034 | 1/1973 | Murry | 179/100.4 ST |

*Primary Examiner*—James W. Moffiti

*Attorney, Agent, or Firm*—Fulwider, Patton, Rieber, Lee & Utecht

[57] ABSTRACT

Apparatus for making stereophonic recordings using multiple microphones, and playing back the recordings through multiple speakers, wherein each of the microphones is mounted with a corresponding speaker in a single enclosure. For convenience, the microphones and speakers may be connected by flexible leads to a separate record-playback unit, and, since each microphone is permanently located immediately adjacent a corresponding speaker, the apparatus is capable of accurately reproducing the recorded sounds in their apparent locations by providing the same stereophonic separation for recording as for playback.

7 Claims, 5 Drawing Figures

STEREOPHONIC RECORDING AND PLAYBACK APPARATUS

BACKGROUND OF THE INVENTION

This invention relates generally to stereophonic sound-recording equipment and, more particularly, to stereophonic recording equipment for home or other use by relatively unskilled operators.

As is well known, stereophonic recording equipment in general utilizes at least two microphones spatially separated so that a wave front from a source of sound will arrive at the microphones at slightly different times, and thereby produce recordable electrical signals displaced in phase relative to each other. When the signals are subsequently reproduced from a recording medium and used to actuate two or more separated loudspeakers, phase-displaced sound waves are generated, and a listener is given the illusion that the sound is emanating from the same direction as the original and not necessarily from any one of the loudspeakers.

Although stereophonic recording equipment has been widely used for some years, there still exists a need for a stereophonic recorder which is relatively simple to operate, which can produce high quality stereophonic recordings, and which preferably uses standard recording tape cassettes. A major difficulty with stereophonic recorders is that, although the general public appreciates listening to stereophonic recordings, they are generally unaware of such recording techniques as proper microphone location necessary to produce pleasing stereophonic results. Furthermore, since dual microphones must be used, there is a certain element of inconvenience for the user, who must plug in and position both microphones before recording. This inconvenience associated with the use of a recorder in a "live" recording mode, usually results in the recorder's not being often used in that mode. This is especially true for portable recorders, where connecting and positioning the microphones is yet another chore to be performed in addition to setting up the recorder itself and its associated speakers.

Another consideration is that users of previously available stereophonic recorders often obtain poor results in the "live" recording mode, because the spatial separation of the microphones during recording is significantly different from the spacing of the speakers during play-back. The original spatial separation of the sound sources is not then faithfully reproduced.

SUMMARY OF THE INVENTION

The present invention resides in a stereophonic recording system which overcomes the foregoing disadvantages by locating each microphone and a speaker in a unitary structure. Thus, the user has only to position the speakers as he would for playing back a stereophonic recording, and the microphones are automatically placed in proper position for live recording.

Briefly, and in general terms, the apparatus of the invention includes a "control" housing containing the normal electrical circuitry and controls, such as a cassette recorder and the necessary switching means, and a pair of speaker housings that are removably attached to the control housing to form a compact, self-contained unit. Each of the speaker housings includes a loudspeaker and a microphone located adjacent the speaker, and flexible cables connect the speaker housing to the control housing.

The microphones are preferably of the electrostatic type with a relatively omnidirectional characteristic. They are also preferably positioned in each speaker enclosure to provide substantial spatial separation of the microphones even when all the enclosures are assembled together for transporting the apparatus.

In a presently preferred embodiment of the invention, the aforementioned electrical means and its associated controls are contained in the control housing, to which two speaker enclosures are removably attached by hinges. The speaker enclosures may be compactly secured to the cabinet in a carrying position, swung to an open position, or removed and placed remotely from the cabinet, the speakers and microphones remaining electrically connected to the electrical means by flexible leads. The microphones are mounted in the enclosures in such a way as to provide sufficient stereophonic separation for recording in any of these positions.

It will be apparent that the present invention represents a signficant improvement in the stereophonic recording field. It provides a simple and convenient means for making live stereophonic recordings which allow faithful reproduction of the recorded sounds with proper stereo separation for both recording and playback. Other aspects and advantages of the invention will become apparent from the following more detailed description taken in conjunction with the accompanying drawings.

DETAILED DESCRIPTION

Figure 1:
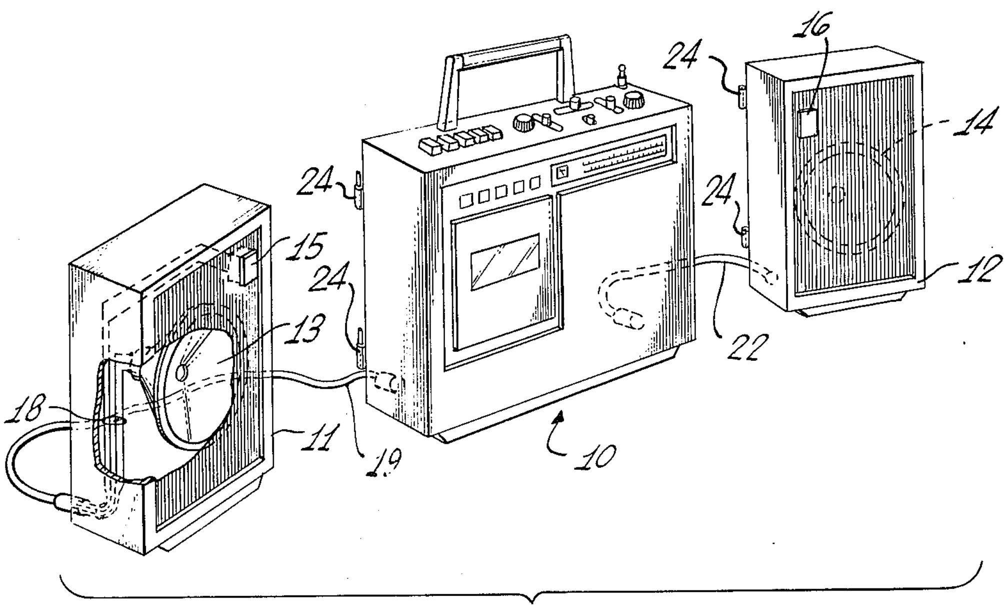
FIG. 1 is a perspective view of portable stereophonic recording apparatus embodying the present invention.

As shown in the drawings for purposes of illustration, the present invention is embodied in portable stereophonic recording apparatus having a combined record-playback-control unit 10 in one cabinet, and two separate speaker enclosures 11 and 12 housing speakers 13 and 14, respectively.

To make live stereophonic recordings, two or more microphones must be used, and, in systems available heretofore, this not only inconvenienced the user, but often resulted in poor quality recordings, especially if the microphone spacing was not chosen consistently with the spacing of the speakers. In accordance with the present invention, two microphones 15 and 16 are housed together with the speakers 13 and 14 in the enclosures 11 and 12, respectively. Thus, left microphone 15 is mounted adjacent left speaker 13 in the left enclosure 11, and right microphone 16 is mounted adjacent right speaker 14 in right enclosure 12.

Figure 2:
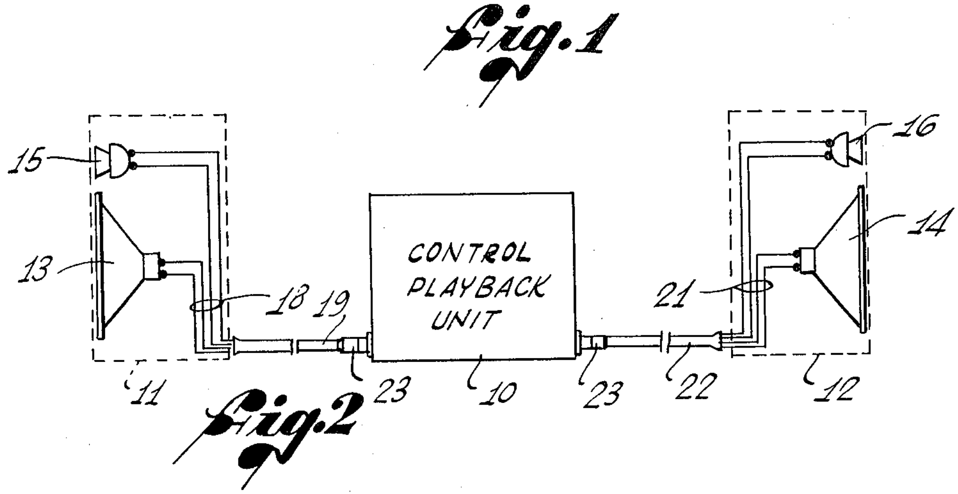
FIG. 2 is a diagrammatic view of the apparatus of FIG. 1, showing connection of two speaker-microphone enclosures with a control unit.
Figure 3A:
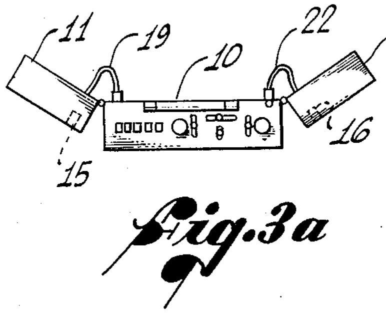
FIGS. 3*a* – 3*c* are plan views of the recording apparatus of FIG. 1 with the speaker-microphone enclosures shown in an open position, a carrying position, and a remotely located position, respectively.
Figure 3B:
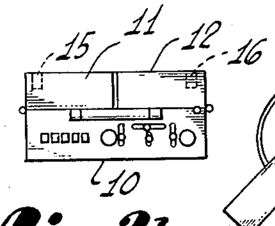
Figure 3C:
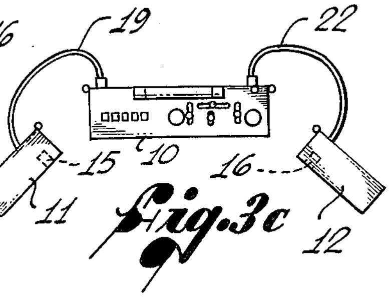

As best illustrated in FIG. 2, the left microphone 15 and left speaker 13 are connected by leads 18 which are carried by a flexible cable 19 to the control unit 10. Similarly, leads 21 from the right microphone 16 and right speaker 14 are carried by the flexible cable 22. The cables 19 and 22 are attached to the control unit 10 by conventional plug and socket combinations 23. Consequently, the microphones 15 and 16 and speakers 13 and 14 may be left permanently connected with the control unit 10, and, when the enclosures 11 and 12 have been located as desired, the apparatus may be operated without further adjustment in either a record mode or a playback mode, with equal stereo separation being automatically obtained for the two modes.

In the illustrative system, the enclosures 11 and 12 are pivotally attachable to the control unit 10 by separable hinges 24. Once hinged to the control unit 10, the enclosures 11 and 12 may be swung into a closed or carrying position, as illustrated in FIG. *3b*, in which the two enclosures are secured against one face of the control unit to form a single structure for ease of handling. The enclosures 11 and 12 may also be pivoted on their hinges 24 through approximately 180° into a side-by-side relationship with the control unit 10, as shown in FIG. *3a*, thus providing greater separation of the speakers 13 and 14 and the microphones 15 and 16.

The enclosures 11 and 12 may also be lifted from their hinges 24 and separated even further from each other. The apparatus may be operated in any of the aforementioned three positions shown in FIGS. *3a* – *3c*. So that some separation of the microphones 15 and 16 is obtained even when the enclosures 11 and 12 are in the carrying position shown in FIG. *3b*, the microphones are lcoated in the enclosures to provide maximum separation in this position. More particularly, when the enclosures 11 and 12 are swung forward to the open position (FIG. *3a*), the left microphone 15 is close to the right-hand side of the left enclosure 11, and the right microphone 16 is close to the left-hand side of the right enclosure 12. Thus, when the enclosures 11 and 12 are swung back to the closed position (FIG. *3b*), the microphones 15 and 16 are separated as much as possible in that position.

Preferably, the microphones 15 and 16 are of the electrostatic type with a relatively omnidirectional characteristic, and have associated automatic level control circuits in the control unit 10 to allow recording without having to continually monitor and adjust the recording level.

It will be apparent from the foregoing description that the apparatus of the invention has a number of advantages over prior systems for the same purpose. One is that it is convenient to use, since the microphone/speaker enclosures 11 and 12 may be left permanently connected to the control unit 10. Another advantage is that because the microphones 15 and 16 are located at the same points as the corresponding speakers 13 and 14, the sound field received by the microphones during recording will be faithfully reproduced on playback. Moreover, this characteristic is largely independent of the relative positions of the enclosures 11 and 12, although varying degrees of stereophonic separation will, of course, be obtained by varying the positions of the enclosures. These features, coupled with conventional automatic level control circuits, allow the user to make recordings of an unusually high quality.

Although a particular embodiment of the invention has been described in detail for purposes of illustration, it will be appreciated that various modifications may be made without departing from the spirit and scope of the invention. Accordingly, the invention is not to be limited except as by the appended claims.

I claim:

1. Portable stereophonic recording and playback apparatus, comprising:
- a plurality of microphones for transducing acoustical energy in a sound field into electrical signals in a like plurality of discrete channels;
- electrical means connectable with said plurality of microphones and selectively operable in a record mode to record said electrical signals onto a recording medium, and subsequently in a playback mode to reproduce the electrical signals from the recording medium;
- a housing for said electrical means;
- a like plurality of speakers, connectable with said electrical means in the playback mode, for transducing said reproduced electrical signals into acoustical energy, thereby to reproduce the sound field;
- a like plurality of independently movable speaker-microphone enclosures, each enclosing one of said speakers and one of said microphones, to provide equal stereophonic separation for both the record and playback modes; and
- a plurality of connecting cables for connecting each of said speaker-microphone enclosures with said electrical means, whereby each of said speaker-microphone enclosures requires only one of said connecting cables to connect both its speaker and its microphone to said electrical means.

2. Apparatus as set forth in claim 1, wherein:
- said microphones are of the electrostatic type having a substantially omnidirectional characteristic; and
- said electrical means include automatic level control means associated with each of said microphones.

3. Apparatus as set forth in claim 1, wherein said electrical means include means for recording on and playing back from standard magnetic tape cassettes.

4. Apparatus as set forth in claim 1, wherein there are two of said microphones, two of said speakers, and two of said speaker-microphone enclosures.

5. Apparatus as set forth in claim 4, wherein:
- said speaker-microphone enclosures are attachable to said housing in a carrying position, movable to a side-by-side position with respect to said housing while still pivotally attached thereto, and removable from said housing to a position of increased separation, said apparatus being operable in any of these three positions.

6. Apparatus as set forth in claim 4, wherein:
- said electrical means has its operating controls located on one or more surfaces of said housing; and
- said apparatus further includes separable hinge means for attaching each of said speaker-microphone enclosures to said housing in such a manner that each of said enclosures may be placed in a closed position covering approximately half of a particular surface of said housing, may be rotated to a second position approximately 180 degrees from said closed position, or may be separated from said housing and spaced therefrom, said apparatus being operable in any of these three positions.

7. Apparatus as set forth in claim 6, wherein said microphones are positioned in said enclosures such that when said enclosures are in said closed position, said microphones are in the upper outer corners of said cabinet means, to provide the maximum possible recording separation for recording with said enclosures in said closed position.

* * * * *